(12) United States Patent
Oates et al.

(10) Patent No.: US 6,852,058 B2
(45) Date of Patent: Feb. 8, 2005

(54) HOLLOW PINION SUPPORT

(75) Inventors: Jack Darrin Oates, Fletcher, NC (US); I-Chao Chung, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 27 days.

(21) Appl. No.: 10/379,089

(22) Filed: Mar. 4, 2003

(65) Prior Publication Data
US 2004/0176206 A1 Sep. 9, 2004

(51) Int. Cl.[7] .............................................. F16H 48/06
(52) U.S. Cl. ...................................................... 475/221
(58) Field of Search ................................. 475/221, 222

(56) References Cited

U.S. PATENT DOCUMENTS

| | | |
|---|---|---|
| RE25,269 E | 10/1962 | Christie |
| 4,050,534 A | 9/1977 | Nelson |
| 5,860,889 A | 1/1999 | Schlosser |
| 6,200,240 B1 | 3/2001 | Oates |

OTHER PUBLICATIONS

Interwheel Differential Drive Differentials of Wheeled Vehicles, Moscow Mashinostroyenie, 1987, pp. 35–45.
Translation of above.

*Primary Examiner*—Dirk Wright
(74) *Attorney, Agent, or Firm*—Carlson, Gaskey & Olds

(57) ABSTRACT

A hollow pinion gear is used in combination with a through shaft to provide coaxial power transfer from one location in a driveline to another location in the driveline. The pinion gear includes a shaft portion with a longitudinally extending bore that receives the through shaft and includes an integrally formed pinion gear head at one end of the shaft portion. A bearing member is installed within the bore between the through shaft and the pinion shaft portion. The bearing member permits relative rotation between the pinion gear and the through shaft.

18 Claims, 4 Drawing Sheets

HOLLOW PINION SUPPORT

BACKGROUND OF THE INVENTION

This invention relates generally to a pinion support and, more particularly, to an improved bearing configuration for supporting a hollow pinion in an axle assembly.

Certain vehicle applications benefit from a drive axle configuration that uses a gear assembly having a hollow pinion gear used in combination with a through shaft. The shaft passes through a bore in the pinion to coaxially transfer power to another area in the vehicle drivetrain. One example of an application that can benefit from this type of gear arrangement is a tandem drive axle set.

A tandem drive axle set is used to distribute rotational power from a driveline input to a set of forward and rear wheels through a forward drive axle assembly and a rear drive axle assembly, respectively. Traditionally, the tandem drive axle set is designed such that the forward drive axle assembly has a ring gear and a pinion gear set that is a mirror image of the rear drive axle assembly ring gear and pinion gear set. Usually, the forward drive axle assembly has a right-hand pinion gear while the rear drive axle assembly has a left-hand pinion gear. It is necessary that the forward and rear drive axle assemblies be mirror images of each other because, traditionally, the forward drive axle assembly has included a set of helical gears that are used to transfer half of the rotational power from an inter-axle differential to the forward drive axle assembly pinion and ring gear set.

The inter-axle differential receives rotational input from the driveline of the vehicle. In such a design, the pinion gear of the forward drive axle assembly rotates in the opposite direction to that of the inter-axle differential. The inter-axle differential transmits the other half of its input to a through shaft, which sends the input back to the rear drive axle assembly. In the rear drive axle assembly the pinion gear rotates in the same direction as the inter-axle differential. Because the helical gears are necessary in the forward drive axle assembly, the axis of the input to the forward drive axle assembly is offset from the pinion gear axis in the forward drive axle assembly by the centerline-to-centerline distance of the helical gears. Therefore, the output of the forward drive axle assembly is on the same axis as the input while the input of the rear drive axle assembly is on the same axis as the forward drive axle pinion gear.

This difference in axis height between the forward axle output to the rear axle input requires different axle pinion angles to be utilized in order to set the driveline angles in the u-joints used in the driveline. Setting and maintaining the driveline angles is difficult. When the driveline angles at the u-joints are not the same it creates adverse torsional loading and vibrations in the drivetrain assembly. Such torsional loading and vibrations can lead to premature failure of the drivetrain assembly. Even when the driveline angles are properly set at the factory, the air-ride suspensions commonly found in heavy duty trucks can alter the driveline working angles in an adverse manner.

As discussed above, the hollow pinion gear configuration solves this problem by providing coaxial power transfer from the forward drive axle to the rear drive axle. This configuration is further described in U.S. Pat. No. 6,200,240 assigned to the assignee of the present invention. The through shaft extends from the inter-axle differential and through the hollow pinion gear. The hollow pinion gear drives the main differential in the forward drive axle assembly. The through shaft extends toward the rear drive axle assembly which utilizes a traditional pinion gear to drive a rear differential. This configuration allows a common axis to be shared by the input to the forward drive axle assembly and the input to the rear drive axle assembly.

One disadvantage with this configuration is that the bearing journals formed on the hollow pinion shaft can be difficult to machine. The hollow pinion shaft has a first bearing journal portion on an inboard end of the shaft and a second bearing journal portion on an outboard end of the shaft. A toothed pinion gear head is formed on the shaft between the first and second bearing journals. Because the first bearing journal portion is positioned close to the pinion gear head, the first bearing journal portion can become mutilated during the gear cutting process, i.e. too much material can inadvertently be removed from this first bearing journal area. This can reduce the strength of this bearing journal, which is undesirable. Further, the mutilation of the bearing journal portion will result in increased scrap rates for the hollow pinion shafts, which can significantly increase costs.

Thus, it is desirable to provide an improved hollow pinion support configuration that eliminates bearing journal machining problems. The improved bearing configuration should be capable of providing similar strength, fatigue life, and operation performance during vehicle operation as the traditional configuration.

SUMMARY OF THE INVENTION

The subject invention provides a hollow pinion gear that is used in combination with a through shaft to provide coaxial power transfer from one location in a driveline to another location in the driveline. The pinion gear includes a shaft portion with a longitudinally extending bore that receives the through shaft and includes an integrally formed pinion gear head at one end of the shaft portion. A radial bearing member is installed within the bore between the through shaft and the pinion shaft portion. The bearing member permits relative rotation between the pinion gear and the through shaft.

A pinion shaft bearing rotatably supports the pinion gear for rotation relative to a stationary axle component, such as an axle housing. Preferably, the pinion shaft includes an outboard bearing journal that directly supports the pinion shaft bearing.

Preferably, a through shaft bearing is installed between the through shaft and a stationary axle component. The through shaft bearing is positioned adjacent to the inboard end face of the pinion gear. The radial bearing member is positioned within the pinion shaft bore at the inboard end of the pinion shaft, adjacent to the through shaft bearing.

Thus, a tandem drive axle set is provided that eliminates the need for pinion gear shaft support between the stationary axle component and the pinion gear shaft on both the inboard and outboard ends of the pinion shaft. By eliminating a pinion shaft inboard bearing journal and by using a through shaft bearing, machining difficulties for the pinion gear head are reduced.

These and other features and advantages of this invention will become more apparent to those skilled in the art from the following detailed description of the presently preferred embodiment. The drawings that accompany the detailed description can be described as follows.

DETAILED DESCRIPTION OF A PREFERRED EMBODIMENT

Figure 1:
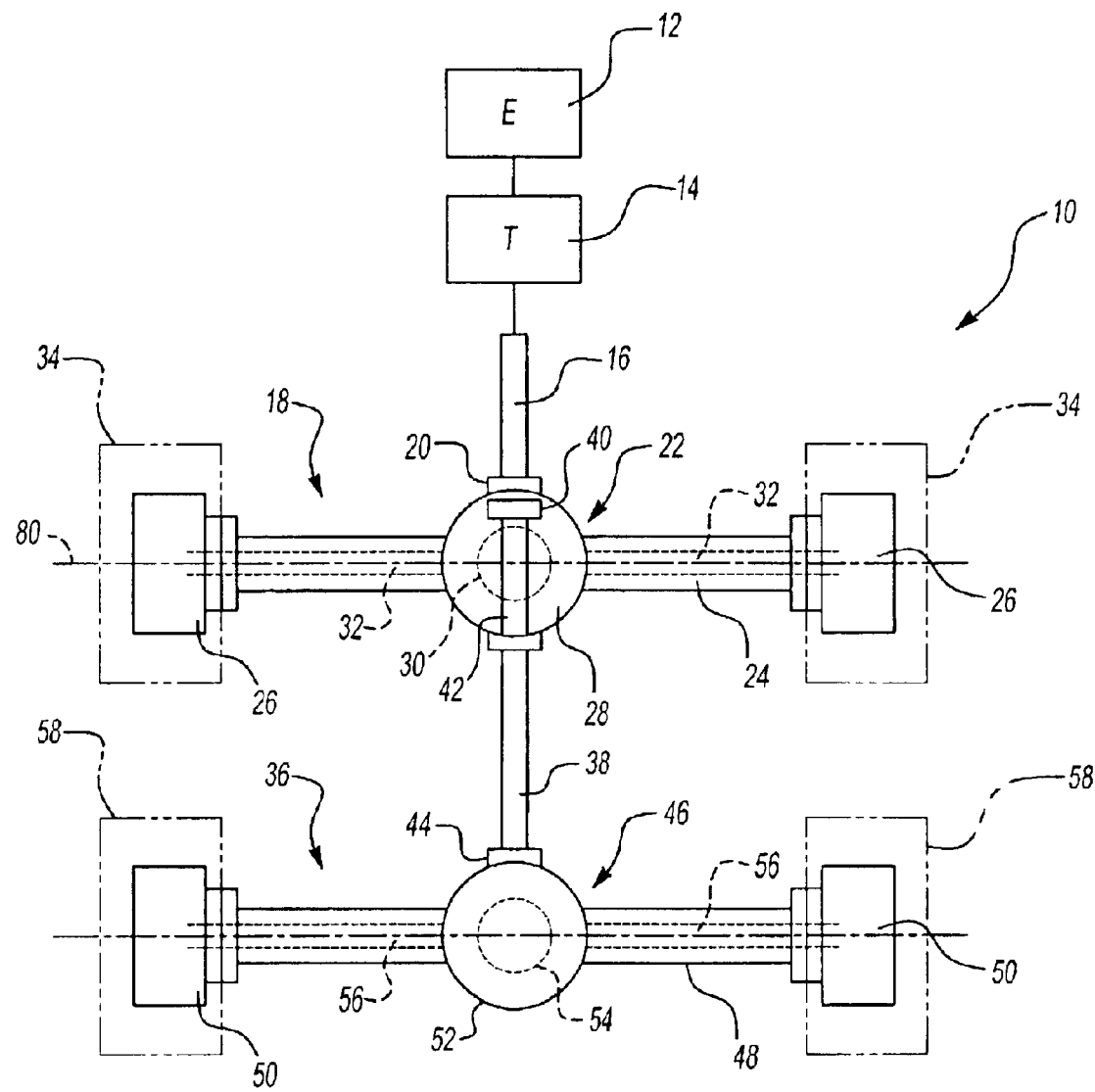
FIG. 1 is a schematic overhead view of a powertrain assembly for a tandem drive axle set.

A powertrain assembly and tandem axle set is shown generally at 10 in FIG. 1. The powertrain assembly 10 includes an engine 12 and transmission 14 that drive a driveshaft 16 as is known in the art. The driveshaft 16 is coupled to a forward drive axle 18 of a tandem axle set at an input 20. The forward drive axle 18 includes a carrier 22, axle housing 24, and a pair of laterally spaced wheel ends 26 positioned on opposing ends of the axle housing 24. The carrier 22 includes a carrier housing 28 and differential assembly 30 that is operably coupled to drive a pair of axle shafts 32. The axle shafts 32 drive the wheel ends 26, which support tires 34 as is known in the art.

The tandem axle set also includes a rear drive axle 36 that is coupled to the forward drive axle 18 with a connecting driveshaft 38. An inter-axle differential (IAD) 40, located in the forward carrier 22, splits driving power supplied at the input 20 between the forward 18 and rear 36 drive axles. The IAD assembly 40 drives the differential assembly 30 in the forward drive axle 18 and transfers driving power to the connecting driveshaft 38 for the rear drive axle 36 via a through shaft 42. The connecting driveshaft 38 is coupled to the rear drive axle 36 at input 44.

The rear drive axle 36 includes a carrier 46, axle housing 48, and a pair of laterally spaced wheel ends 50 positioned on opposing ends of the axle housing 48. The carrier 46 includes a carrier housing 52 and differential assembly 54 that is operably coupled to drive a pair of axle shafts 56. The axle shafts 56 drive the wheel ends 50, which support tires 58 as discussed above.

Figure 2:
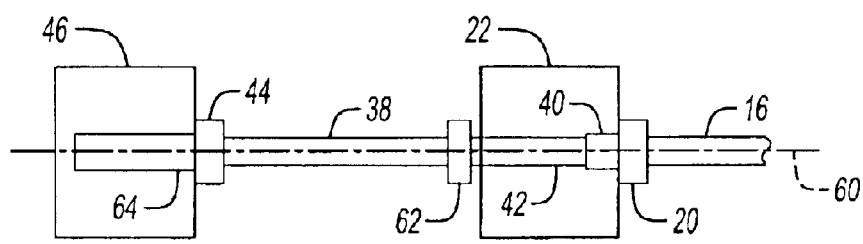
FIG. 2 is a schematic side view of the assembly of FIG. 1.

As shown in FIG. 2, the input 20 to the forward carrier 22 shares a common axis 60 with the input 44 to the rear carrier 46. As discussed above, the input 20 to the forward carrier 22 is operable coupled to the IAD assembly 40, which is in turn operably coupled to the through shaft 42. The forward drive axle 18 includes an output 62 that is coupled to one end of the connecting driveshaft 38 while the other end of the connecting driveshaft 38 is coupled to the input 44 of the rear carrier 46. The input 44 drives a rear pinion 64 of the rear differential assembly 54, which will be discussed in greater detail below.

Figure 3:
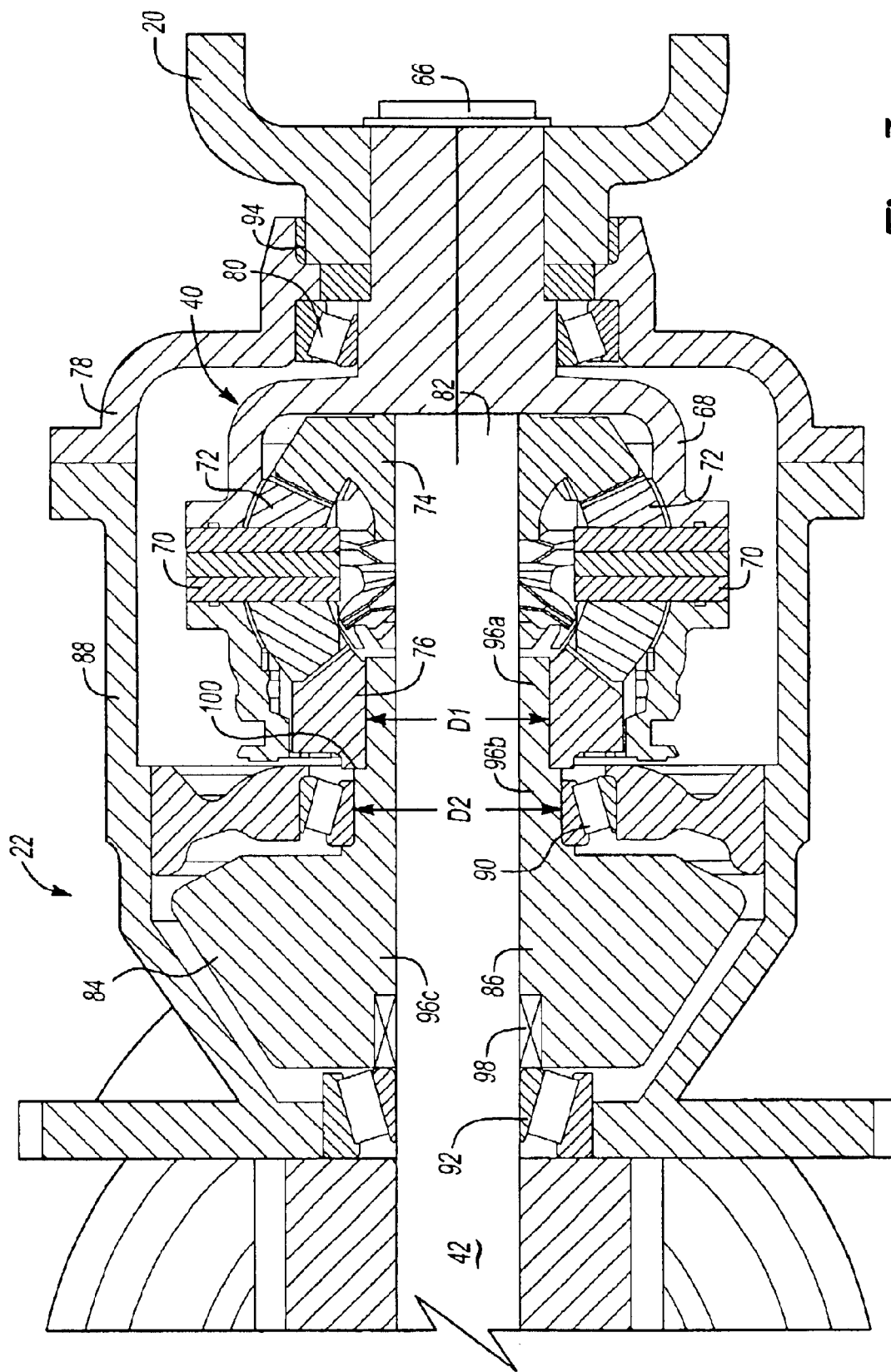
FIG. 3 is a cross-sectional side view of a carrier in the forward drive axle of the tandem set, which incorporates the subject invention.

As shown in FIG. 3, the forward drive axle 18 includes the IAD assembly 40 that is preferably fastened to the input 20 through a fastener 66. Input 20 is preferably a yoke assembly that receives rotational input from driveshaft 16. The IAD assembly 40 includes an IAD housing 68 and an IAD gear assembly, which includes a plurality of spider shafts 70, a plurality of spider gears 72, an outboard side gear 74, and an inboard side gear 76. IAD assembly 40 is supported within an inter-axle differential cover 78 by a single tapered roller bearing 80. The outboard 74 and inboard 76 side gears are substantially enclosed within the IAD housing 68. The bearing 80 directly engages the inter-axle differential housing 68 at a position outboard from the outboard side gear 74. Bearing 80 is directly supported between the IAD cover 78 and the IAD housing 68.

Rotation of driveshaft 16 is transferred to IAD assembly 40 through input 20. IAD assembly 40 in turn rotates the spider shafts 70 that rotate the spider gears 72. Spider gears 72 rotate the side gears 74, 76. The operation of the IAD gear assembly is well known in the art and will not be discussed in detail.

Through shaft 42 includes a first end 82 that is secured to the outboard side gear 74. Through shaft 42 extends from the outboard side gear 74 through a hollow pinion gear 84. Hollow pinion gear 84 includes a pinion gear head 86 and is rotated by the inboard side gear 76. Through shaft 42 is not fixed to rotate with inboard side gear 76. Through shaft 42 and side gears 74, 76 do tend to all rotate at the same speed. Side gears 74, 76 are not fixed to rotate together. A single tapered roller bearing 90 supports hollow pinion gear 84 within a main differential cover 88 that is preferably mounted to an axle component such as the axle housing 24. Hollow pinion gear 84 drives the forward differential assembly 30. The operation and structure of the forward differential assembly 30 is well known in the art and does not form a novel portion of the present invention.

The bearing 90 is supported directly between the main differential cover 88 on an outboard end of the hollow pinion gear 84. Bearing 90 is also preferably positioned inboard from the IAD assembly 40.

Through shaft 42 extends outwardly from forward axle 18 and passes closely adjacent either above or below axle shafts 32. A seal 94 is utilized to seal one end of IAD cover 78 to input 20. As shown in FIG. 2, through shaft 42 and hollow pinion gear 84 are on the same axis 60 as the input 20 to through shaft 42 from IAD assembly 40 and the output 62 from the forward axle 18.

The hollow pinion gear 84 comprises a hollow pinion shaft 96 defining a longitudinally extending central bore, and which is integrally formed as one piece with the pinion gear head 86. The pinion gear head 86 is formed at the inboard end of the pinion shaft 96. The through shaft 42 extends through the central bore such that through shaft 42 extends outward from both ends of the hollow pinion shaft 96. The bearing 90 directly engages the pinion shaft 96 and is adjacent to the pinion gear head 86.

The hollow pinion shaft 96 includes a first portion 96a received within the outboard side gear 74, a second portion 96b for supporting the first bearing 90, and a third portion 96c forming the pinion gear head 86. The first portion 96a is defined by a first diameter D1 and the second portion 96b is defined by a second diameter D2 greater than the first diameter D1 to define thrust surface 100 for reaction with the inboard side gear 76.

A second tapered roller bearing 92 is mounted in direct engagement with the through shaft 42 adjacent to and end fact of the pinion gear head 86. The bearing 92 is preferably mounted directly between the through shaft 42 and the main differential cover 88, for example. A bearing member 98 is installed within the bore directly between the pinion shaft 96 and the through shaft 42. The bearing 98 is preferably a radial bearing or bushing that reacts to radial loading. The radial bearing member 98 allows relative rotation between the pinion gear 84 and the through shaft 42 as required by certain operating conditions. Thrust loading on the inboard side of the IAD gear assembly is reacted by at least one of the tapered roller bearings 90, 92. This bearing configuration will be discussed in further detail below.

Figure 4:
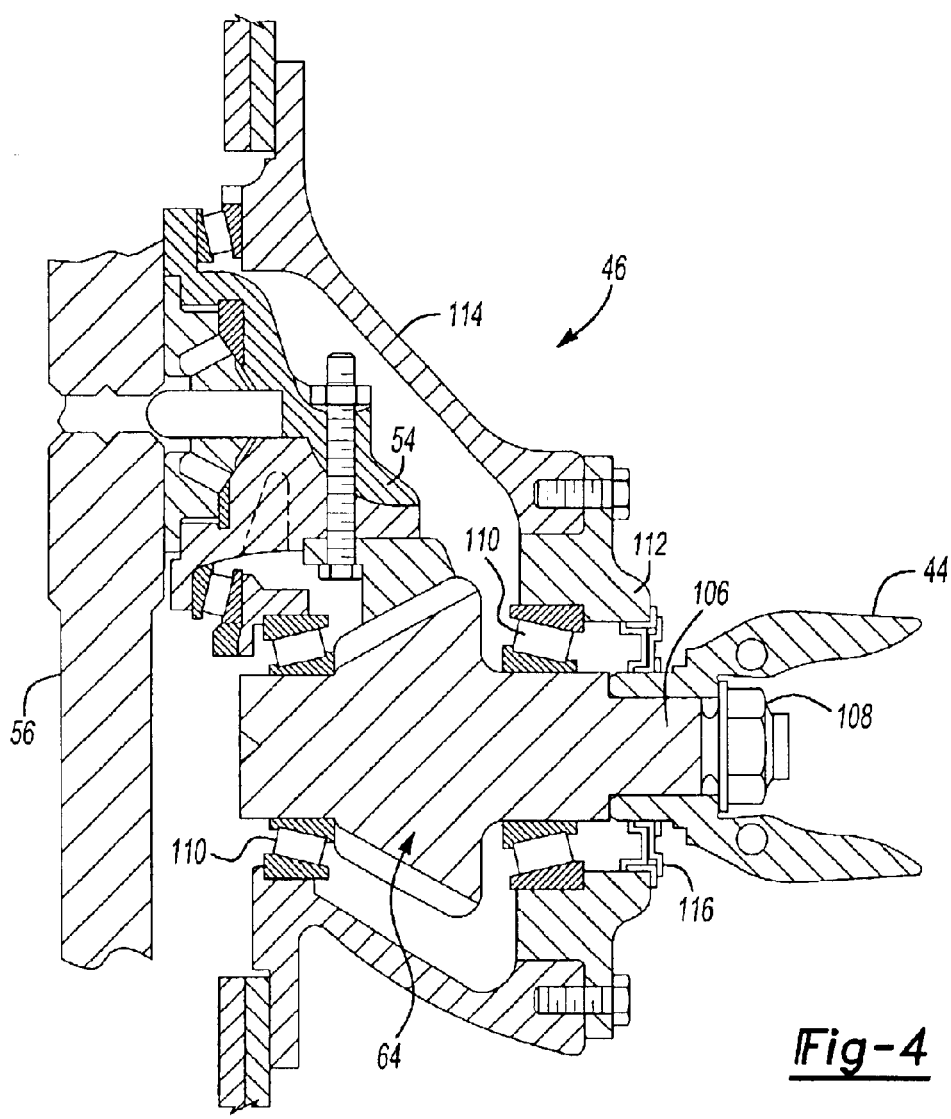
FIG. 4 is a cross-sectional top view of a carrier in the rear drive axle of the tandem set.

In FIG. 4, a cross-sectional top view of the rear carrier assembly 46 of the rear drive axle 36 is shown. A rear pinion gear 64 has an input end 106 that is preferably secured via a fastener 108 to input 44. Input 44 receives rotational input from connecting driveshaft 38. As mentioned above, input end 106 is on the same axis 60 as through shaft 42. In one embodiment, a plurality of roller bearings 110 and a pinion cage 112 support rear pinion gear 64 within a rear differential cover 114. Preferably, roller bearings 110 are tapered roller bearings as shown. Rotation of rear pinion gear 64 drives a rear differential assembly 54. The design of rear differential assembly 54 is well known in the art. The rear differential assembly 54 drives the rear drive axle shafts 56. A seal 116 seals a gap between pinion cage 112 and input 44. Preferably, seal 116 and seal 94 comprise annular seals as are known in the art.

Figure 5:
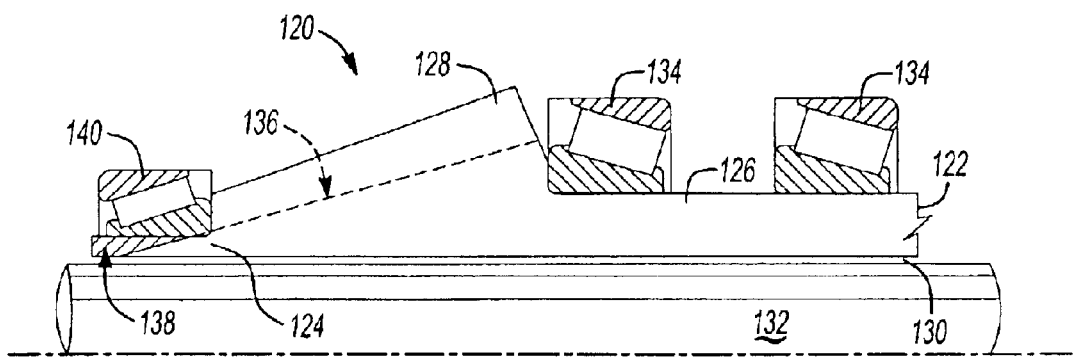
FIG. 5 is a cross sectional view, partially cut away, of a prior art pinion gear and bearing support.

The improved bearing configuration of the subject invention eliminates the need for a bearing journal on an inboard end of the pinion shaft 96. A known pinion gear is shown generally at 120 in FIG. 5. The pinion gear 120 includes a pinion shaft 122 having an inboard bearing journal 124, an outboard bearing journal 126 and a pinion gear head 128 formed between the inboard 124 and outboard 126 bearing journals. The shaft 122 includes a longitudinally extending central bore 130 that receives a through shaft 132, as described above. A pair of tapered roller bearings 134 rotatably support the pinion shaft 122.

Because the pinion gear head 128 is close to the inboard bearing journal 124 there is a high probability that too much material will be removed when the pinion gear head is machined. A tool path 136 shows the path a tool takes to cut pinion gear teeth on the pinion gear head 128. The possible mutilation area in the inboard bearing journal 124 affected by this tool path 136 cut is indicated at 138. If too much material is removed from the inboard bearing journal 124, the strength of the journal can be significantly affected, which is undesirable and can lead to premature failure. Elimination of the inboard bearing journal 124 also eliminates the need for an inboard bearing 140.

The preferred improved bearing configuration is shown in FIG. 3. In this configuration, the inboard bearing journal is eliminated. Instead of rotatably supporting the pinion gear 84 at an inboard end, a bearing 92 is used to support the through shaft 42 adjacent to the pinion gear head 86. The bearing 92 is mounted directly between an axle member and the through shaft 42. Bearing 92 reacts to thrust loading generated by the IAD assembly 40.

Because the bearing 92 is supported directly on the through shaft 42 its size can be reduced as compared to a bearing mounted on an inboard bearing journal 124 of the pinion shaft 122. Also, the setting of pinion axial position is made easier and can be done simply by positioning shims between the pinion gear 84 and the bearing 92. Finally, machining of pinion gear teeth on the pinion gear head 86 is made easier because there is no interference from an inboard bearing journal.

Figure 6:
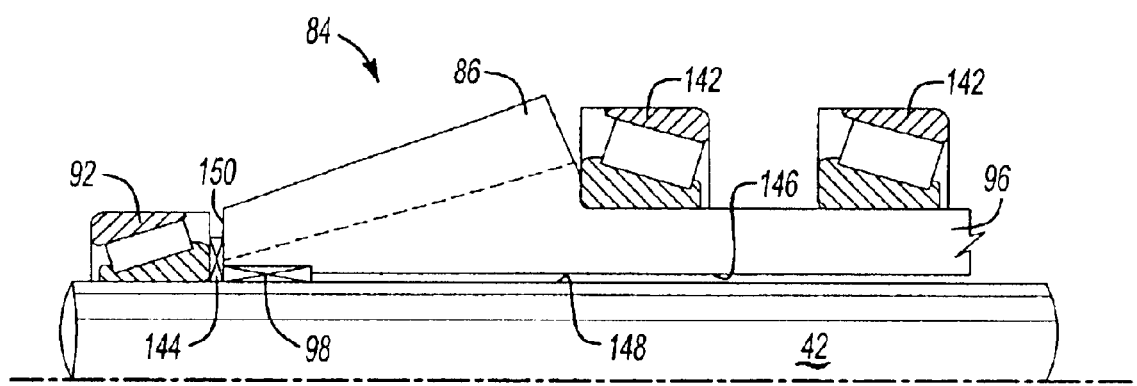
FIG. 6 is a cross-section view, partially cut away, of one embodiment of a pinion gear and bearing support incorporating the subject invention.

An alternate bearing configuration is shown in FIG. 6. In this configuration, the hollow pinion shaft 96 a pair of tapered roller bearings 142 are used to pinion shaft 96 outboard from the pinion gear head 86. The radial bearing member 98 is positioned within the pinion shaft bore and a thrust bearing member 144 is positioned between bearing 92 and radial bearing member 98 to transfer thrust load from the pinion gear 84 to bearing 92.

Radial bearing member 98 directly engages an internal bore surface 146 and an external surface 148 of the through shaft 42. The thrust bearing member 144 directly engages the external surface 148 of the through shaft 42 and an end face 150 of the pinion gear head 86 and further is in direct engagement with bearing 92.

As shown in FIGS. 1–6, the present design permits a common axis 60 to be shared by IAD assembly 40, through shaft 42, hollow pinion gear 84, and rear pinion gear 64. Thus, the present design eliminates the need to adjust driveline angles between yokes on the ends of any of the inputs or outputs to the tandem drive axle set. In addition, the present design enables the elimination of the traditional helical gear set in the forward drive axle 18. Further, the elimination of an inboard journal portion and the addition of a separate through shaft bearing 92 provides a more robust bearing configuration.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A drive axle comprising:
   an input;
   a hollow pinion gear operably connected to said input and including a pinion shaft portion with a central bore and a pinion gear head portion formed about an external surface of said pinion shaft portion;
   a through shaft received within said central bore for transferring a driving force from said input to an output; and
   a least one bearing member positioned within said bore between said pinion gear head portion and said through shaft to allow relative rotation between said through shaft and said hollow pinion gear under predetermined conditions.

2. A drive axle as recited in claim 1 wherein said bearing member directly engages an external surface of said through shaft and an internal bore surface of said pinion shaft portion.

3. A drive axle as recited in claim 2 wherein said bearing member is a radial bearing.

4. A drive axle as recited in claim 2 wherein said bearing member is a radial bushing.

5. A drive axle as recited in claim 1 including at least one pinion shaft bearing and wherein said pinion shaft portion includes an inboard end and an outboard end with said pinion gear head portion being formed at said inboard end and a bearing journal being formed at said outboard end for directly supporting said pinion shaft bearing.

6. A drive axle as recited in claim 5 including at least one through shaft bearing mounted directly between said through shaft and an axle housing member and adjacent to said pinion gear head portion.

7. A drive axle as recited in claim 6 including at least one thrust bearing mounted between an end face of said pinion gear head portion and said through shaft bearing.

8. A drive axle as recited in claim 1 including an inter-axle differential operably coupled to said through shaft for distributing the driving force between a forward drive axle and a rear drive axle of a tandem drive axle set.

9. A drive axle as recited in claim 8 including a rear pinion gear for providing a rear input driving force to said rear drive axle and a connecting shaft for transferring the driving force from said output to said rear pinion gear wherein said rear pinion gear, said through shaft and said hollow pinion gear are all coaxial.

10. A drive axle as recited in claim 1 including at least one pinion shaft bearing mounted directly to said external surface of said pinion shaft portion and at least one through shaft bearing mounted directly between said through shaft and an axle housing member.

11. A drive axle as recited in claim 10 wherein said bearing member comprises a radial bearing, said pinion shaft bearing comprises a first tapered roller bearing, and said through shaft bearing comprises a second tapered roller bearing.

12. A tandem drive axle set comprising:

a forward drive axle including a forward input operably coupled to a vehicle driveshaft, an inter-axle differential assembly operably coupled to said forward input, a forward pinion gear for transferring a driving force from said inter-axle differential assembly to a forward differential assembly to drive a pair of forward axle shafts, and a through shaft for transferring driving force from said inter-axle differential assembly to an output;

said forward pinion gear including a pinion shaft with a longitudinally extending central bore and a pinion gear head formed at one end of said pinion shaft, said pinion shaft and said pinion gear head being integrally formed as a single piece;

said through shaft being received within said central bore and having one end coupled to said inter-axle differential and an opposite end coupled to said output;

a least one bearing member positioned within said bore to allow relative rotation between said through shaft and said forward pinion gear;

a rear drive axle including a rear input, a rear pinion gear operably coupled to said rear input to transfer driving force from said rear input to a rear differential assembly to drive a pair of rear axle shafts; and a connecting shaft extending between said forward and rear drive axles for transferring driving force from said output to said rear input wherein said through shaft, said forward pinion gear, and said rear pinion gear are coaxial.

13. A tandem drive axle set as recited in claim 12 wherein said bearing member is mounted directly between an external surface of said through shaft and an internal bore surface of said pinion shaft.

14. A tandem drive axle set as recited in claim 12 including at least one pinion shaft bearing wherein said pinion shaft includes an inboard end and an outboard end with said pinion gear head being formed at said inboard end and a journal portion being formed at said outboard end for supporting said pinion shaft bearing.

15. A tandem drive axle as recited in claim 14 wherein said at least one pinion shaft bearing comprises a pair of tapered roller bearings.

16. A tandem drive axle set as recited in said claim 14 including at least one through shaft bearing mounted directly between said through shaft and a forward axle housing member.

17. A tandem drive axle set as recited in claim 16 including at least one thrust bearing mounted between an end face of said pinion gear head and said through shaft bearing.

18. A tandem drive axle as recited in claim 16 wherein said at least one pinion shaft bearing comprises a single tapered roller bearing, said bearing member comprises a radial bearing assembly, and said at least one through shaft bearing comprises a single tapered roller bearing.

* * * * *